United States Patent [19]
Hata et al.

[11] Patent Number: 4,721,515
[45] Date of Patent: Jan. 26, 1988

[54] CONTROL SYSTEM OF A DUAL-CYLINDER TYPE DEHUMIDIFIER

[75] Inventors: Yasuhisa Hata, Akashi; Osamu Akamatsu; Masaaki Kitaue, both of Kobe, all of Japan

[73] Assignee: Nippon Air Brake Co., Ltd., Kobe, Japan

[21] Appl. No.: 932,121

[22] Filed: Nov. 19, 1986

[30] Foreign Application Priority Data

Nov. 25, 1985 [JP] Japan .................. 60-265604

[51] Int. Cl.$^4$ ............................................. B01D 53/04
[52] U.S. Cl. ......................................... 55/162; 55/163; 55/179; 55/387; 55/DIG. 17
[58] Field of Search ............... 55/33, 62, 162, 163, 55/179, 387, DIG. 17

[56] References Cited

U.S. PATENT DOCUMENTS

| | | | |
|---|---|---|---|
| 3,080,693 | 3/1963 | Glass et al. | 55/163 |
| 3,395,511 | 8/1968 | Akerman | 55/33 X |
| 3,486,303 | 12/1969 | Glass et al. | 55/162 |
| 3,659,399 | 5/1972 | Kauer, Jr. et al. | 55/163 X |
| 3,778,967 | 12/1973 | Kauer, Jr. et al. | 55/163 X |
| 3,902,875 | 9/1975 | Bridigum et al. | 55/162 |
| 3,923,479 | 12/1975 | Glass et al. | 55/33 X |
| 3,937,622 | 2/1976 | Hewitt et al. | 55/163 |
| 4,007,021 | 2/1977 | Gyllinder | 55/62 X |
| 4,331,457 | 5/1982 | Mörner | 55/163 |
| 4,549,888 | 10/1985 | Fannin | 55/163 |

FOREIGN PATENT DOCUMENTS

| | | | |
|---|---|---|---|
| 3210030 | 9/1983 | Fed. Rep. of Germany | 55/162 |
| 3231519 | 3/1984 | Fed. Rep. of Germany | 55/162 |
| 3244414 | 6/1984 | Fed. Rep. of Germany | 55/162 |
| 23621 | 6/1980 | Japan . | |
| 86231 | 6/1984 | Japan . | |
| 1127621 | 12/1984 | U.S.S.R. | 55/163 |

Primary Examiner—Robert Spitzer
Attorney, Agent, or Firm—J. B. Sotak

[57] ABSTRACT

This invention relates to a novel electronic system for controlling a twin-type of air dryer arrangement. Normally, the adsorption elements (DR1) and (DR2) change over their adsorptive and regenerative cycles alternately by an "ON" signal produced by a governor (GO). In addition, in case that the compressor works continuously for a long period of time, the adsorptive and regenerative cycles are changed over whenever a predeterined time elapses. Thus, it is possible to make the entire air dryer more compact, to have less change-over operation and to use the relevant devices for much longer time.

6 Claims, 6 Drawing Figures

CONTROL SYSTEM OF A DUAL-CYLINDER TYPE DEHUMIDIFIER

FIELD OF THE INVENTION

This invention relates to a control system for a two-cylinder type dehumidification unit used in the supply of air to air brakes, e.g., for railway transit vehicles or railroad trains.

BACKGROUND OF THE INVENTION

Several examples of conventional techniques are shown and disclosed in Japanese Patent Nos. 1980-23621 and 84-86231, as well as Japanese Patent No. 1978-34664, which corresponds to U.S. Pat. No. 3,923,479. For the sake of convenience, these prior art arrangements are basically illustrated and substantially simulated in FIGS. 4–6 of the subject application.

Referring now to FIG. 4, there is shown a standard two-cylinder type of dehumidification unit. A conventional air compressor CO is connected to cooler CL. That is, the outlet of the air compressor CO is coupled to the input of cooler CL. A drain valve DV has its inlet connected to the outlet of the cooler CL. The outlet of the drain valve DV is connected to the inputs of a pair of electromagnetic valves MV1 and MV2. A pair of dehumidification cylinders DR1 and DR2 containing desiccating medium have their inlets connected to the outlets of the electromagnetic valves MV1 and MV2, respectively. A pair of directional control check valves CV1 and CV2 are connected to the respective outlets of the dehumidification cylinders DR1 and DR2. A pair of chokes or throttles NV1 and NV2 are connected in parallel to the respective check valves CV1 and CV2. A regenerating air reservoir SR is connected to the throttles NV1 and NV2 and the check valves CV1 and CV2. A check valve CV3 prevents reverse air flow from an air reservoir MR to the regenerating air reservoir SR. That is, the air reservoir MR is connected to the regenerating air reservoir SR by the check valve CV3. A governor GO is installed in combination with the air reservoir MR and controls the maximum pressure surge to a value of P2 and also controls the minimum pressure surge to a value of P1. Thus, the pressure in the air compressor CO and in the drain valve DV are controlled. The electromagnetic valves MV1 and MV2 each have an exhaust position b which closes the inlet as well as opens the outlet into the atmosphere during off time periods and have a supply position a which allows the air to go from the inlet to the outlet and closes the open exhaust during on time periods.

Now when the electromagnetic valve MV1 is in the supply position a and with the electromagnetic valve MV2 off, the humid air from the air compressor CO is supplied to the dehumidification cylinder DR1 through the cooler CL and the drain valve DV. The humid air is dried by the desiccant medium in the dehumidification cylinder DR1. From there the dried air flows to the regenerating air reservoir SR through the check valve CV1 and reaches the air reservoir MR through the check valve CV3. At this time, a portion of the dried air which came through the check valve CV1 flows to the outlet of the other dehumidification cylinder DR2 through the throttle NV2. There the dried air regenerates the desiccant medium in this dehumidification cylinder DR2 and the air flowing out picks humidity from the dessicant. This humid air is then exhausted through the electromagnetic valve MV2 which is in the exhaust position b.

Now when the process is reversed, namely, the electromagnetic valve MV1 is turned off and the electromagnetic valve MV2 turned on, the humid air from the compressor CO is dried in the other dehumidification cylinder DR2 and at the same time regeneration of the desiccant medium takes place in the dehumidification cylinder DR1.

When the pressure in the air reservoir MR reaches the upper limit pressure surge value P2, the governor GO stops the air compressor CO and simultaneously causes the draining of water in the drain valve DV. When the pressure of the air reservoir MR decreases to the lower limit surge value P1, the governor GO stops the draining of water from the drain valve DV and simultaneously causes the air compressor CO to start up operation.

Referring now to FIGS. 5 and 6, there are shown time charts relating to the control method of switching operations which occur during the dehumidifying and regenerating cycles of the respective cylindrical dehumidifiers DR1 and DR2 of FIG. 4.

In a first type of conventional process shown in FIG. 5, the electromagnetic valves MV1 and MV2 are switched on and off in a fixed normal time T. The time periods T are set by a suitable timer (not shown in the Fig.). Thus, the dehumidifying and regenerating cycles of each of the dehumidification cylinders DR1 and DR2 are reciprocally repeated at equal times T.

In a second type of conventional process shown in FIG. 6, there is shown a time chart which was made from the listing of FIG. 3 which appears in Japanese Patent No. 1978-34664, corresponding to U.S. Pat. No. 3,923,479. It will be seen that the swithing cycles, namely, the on and off periods, are set by the governor GO. The governor Go senses the pressure P of the air reservoir MR, and either causes the operation or the non-operation of the air compressor CO. When the air compressor CO is stopped, both electromagnetic valves MV1 and MV2 are turned off and the condition of both dehumidification cylinders DR1 and DR2 is set for regeneration. When the air compressor CO is restarted, the condition of the previous operating period is reversed and the electromagnetic valves MV1 and MV2 are switched on. Thus, the regenerating and dehumidifying of the dehumidification cylinders DR1 and DR2 are reversed.

The present invention attempts to solve the following problems. In the first conventional process shown in FIG. 5, the dehumidifying and regenerating cycles in the dehumidification cylinders DR1 and DR2 are reciprocally repeated every time period T as set by a timer without any relationship to the operation and non-operation phases of the air compressor CO. Even when the air compressor CO is stopped, the cycling or frequency of switching is continuous, thereby increasing wear and tear and extending the useful life of the electromagnetic valves MV1 and MV2. In such a continuous switching system, the control parts are susceptible to undue failures.

In the second conventional process shown in FIG. 6, the following problem is normally present.

First in the case, air is introduced into the air reservoir MR from the atmosphere until the upper limit surge value P2 of the governor GO t 10 in FIG. 6 is reached. In this case the pressure increase from the lower limit surge value P1 to the upper limit surge value P2 is slow t 11 in FIG. 6 because of the large consumption of air in the air reservoir MR during introduction of air from the governor GO. Thus, the driving operation is continued by the same dehumidification cylinder DR1 during the entire time, and thus the drying limit is surpassed and the efficiency of drying quickly decreases.

OBJECTS OF THE INVENTION

Accordingly, it is an object of this invention to provide a new and improved system for more dehumidifying humid air and for regenerating the desiccant contained in a pair of dehumidification cylinders.

Another object of this invention is to provide a new and improved air drying system comprising a pair of cylindrical dehumidifiers containing a desiccating medium, an air compressor supplying moist air to the inlet of one of the cylindrical dehumidifiers and flowing toward the outlet of one of the cylindrical dehumidifiers so that the moist air is dehumidified and is dried by the desiccating medium in one of the cylindrical dehumidifiers and letting a portion of this dry air from the one cylindrical dehumidifier flow through the other cylindrical dehumidifier from its outlet to the inlet so that the desiccating medium in the other of the cylindrical dehumidifiers is regenerated, means for setting the time period for dehumidification, the means for operating the air compressor time period which is longer than the set time period, the means for switching the dehumidification cylinder from dehumidifying to regenerating at the set time period, and the means for stopping the air compressor but retaining the condition within the dehumidification cylinder as it was before the stopping of the air compressor and for reversing the condition within the dehumidification cylinders when the air compressor is restarted.

BRIEF DESCRIPTION OF THE DRAWINGS

The above objects and other attendant features and advantages of the subject invention will become more readily evident from the following detailed description when considered in conjunction with the accompanying drawings, wherein.

DETAILED DESCRIPTION OF THE INVENTION

Figure 1:
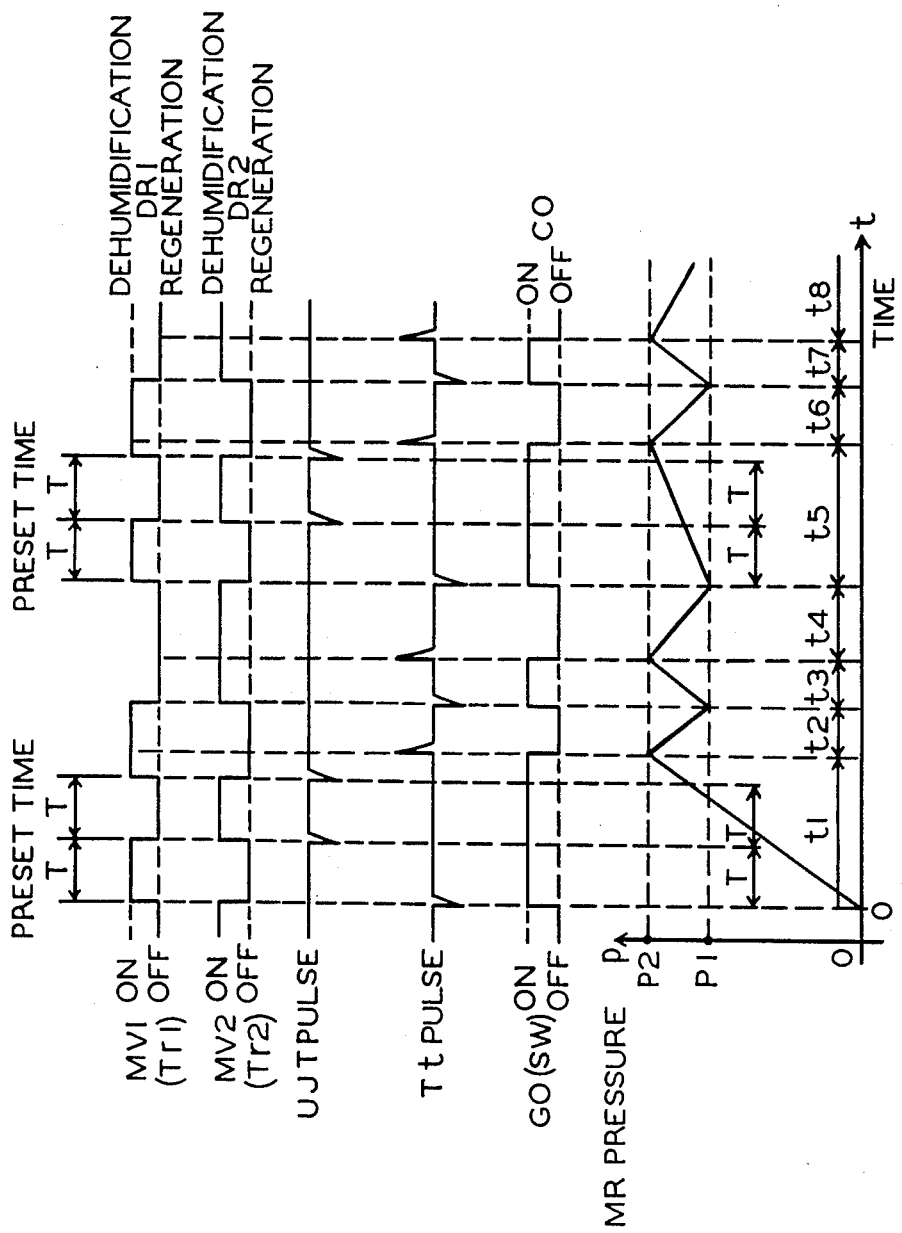
FIG. 1 is the time chart showing an example of timing operation.

The following is a listing of the components and parts shown in FIG. 1 and utilized in practice in the subject disclosed invention:

CO: air compressor
DR1, DR2: dehumidification cylinders
MR: air reservoir
GO: pressure governor
T: preset time
MV1, MV2: electromagnetic valves (switching valves)
SW: governor GO continuous switch
FF: flip-flop circuit
TC: trigger circuit
Tt: trigger transformer The unique process of the present invention attempts to eliminate the above-mentioned prior art problems in the following manner. As noted above, each cylindrical dehumidifier contains a suitable desiccant medium. In one dehumidifier humid air is supplied to the inlet from an air compressor and the air flows therethrough toward the outlet of the cylinder.

The desiccant medium in the one cylinder causes the humid air to become dehumidified and, in turn, to become dry. By permitting some portion of this dried air of the one cylindrical dehumidifier to go through the other cylindrical dehumidifier in the reverse direct from its outlet to its inlet, the desiccant medium in this latter cylindrical dehumidifier is regenerated. The control process of the two-cylinder type dehumidification system which repeats the process of drying the air by the desiccant material in the cylinder and regenerating the desiccant material in the other cylinder permits operation of the dehumidification system in a more efficient manner. The time period for dehumidifying the desiccant is preset. The operation time of the air compressor is selected to be longer than the set time period, but the switching of the dehumidification and regeneration of the dehumidification cylinder is executed at the set time. Upon the stopping of the air compressor, the condition or operation of the dehumidification cylinder is retained int he same state as it was before the stopping of the compressor. When the air compressor starts to operate again, the condition is reversed so that the opposite condition of the dehumidification cylinder is initiated.

According to the present invention, in the case when the operation time of the air compressor is shorter than the set time or at the time of non-operation of the air compressor, switching of dehumidifying and regenerating does not occur. Thus, unnecessary and undue switching is eliminated. When the air compressor changes from non-operation to operation, dehumidification and regeneration are switched, and when the operation time of the air compressor becomes longer than the set time, dehumidification and regeneration is switched every set time. Therefore, a decrease in drying efficiency is prevented.

An example of implementation of this invention is explained below based on FIGS. 1–3.

Figure 2:
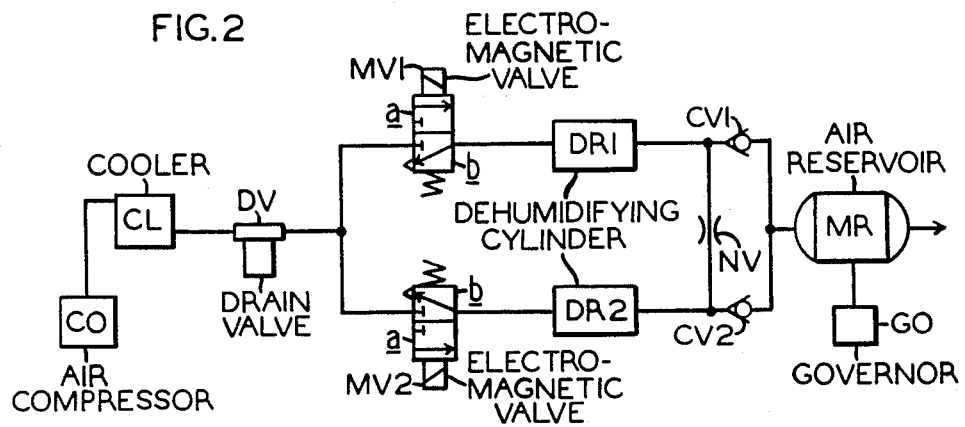
FIG. 2 is a structural schematic of the subject invention.
Figure 3:
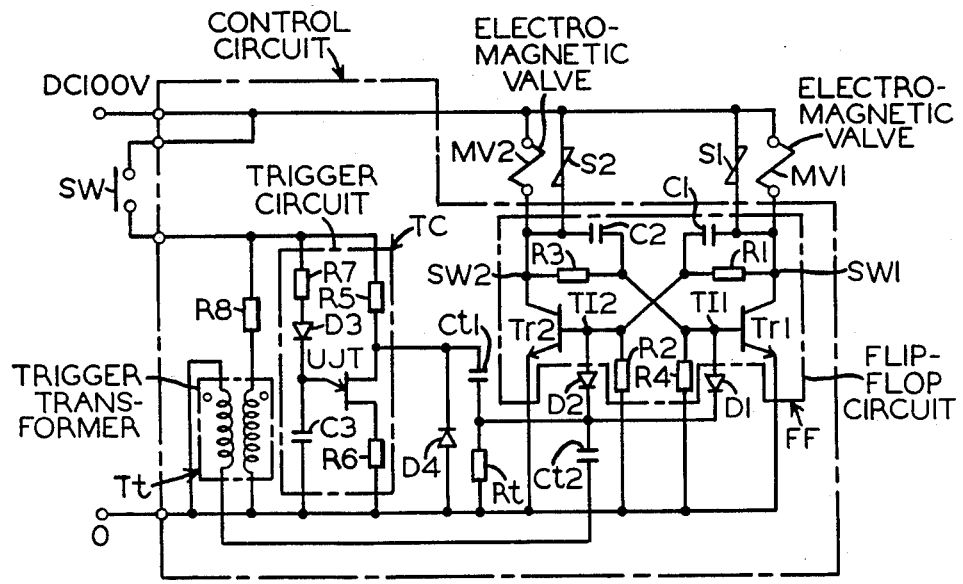
FIG. 3 shows the electric control circuit for the operational structure of FIG. 2.
Figure 4:
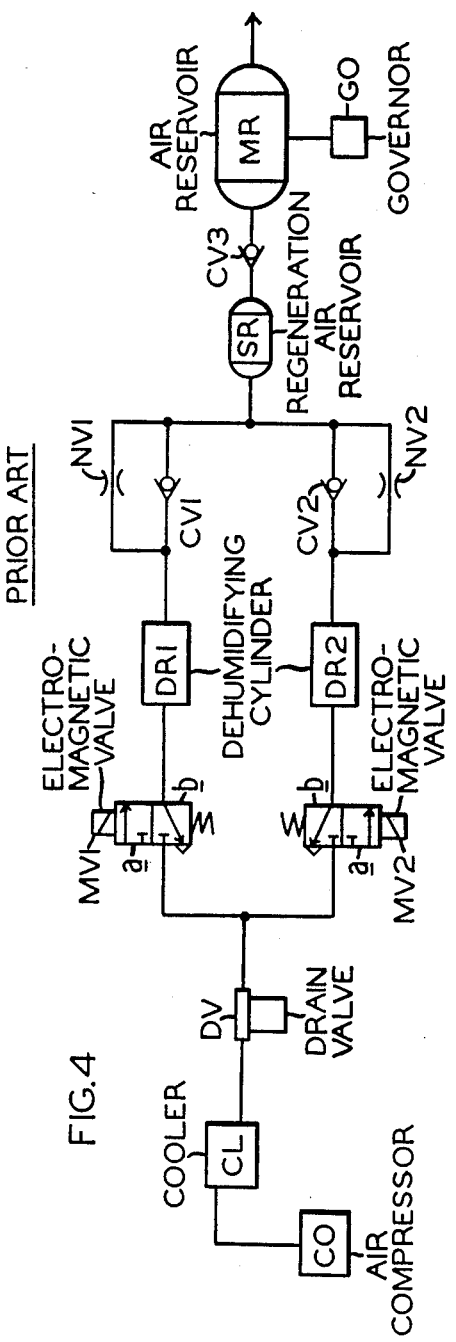
FIG. 4 is a structural drawing of a conventional type of the two-cylinder type dehumidification system.
Figure 5:
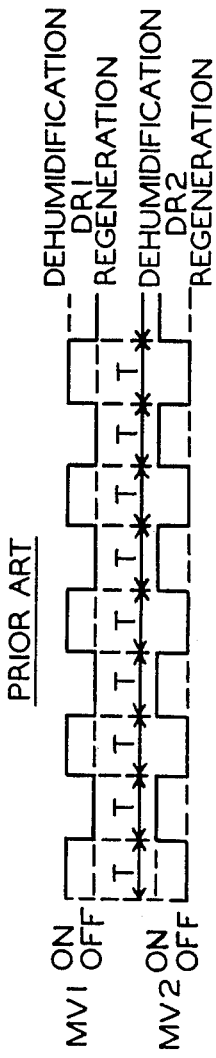
FIG. 5 is a time chart showing the conventional control process used in the system of FIG. 4.
Figure 6:
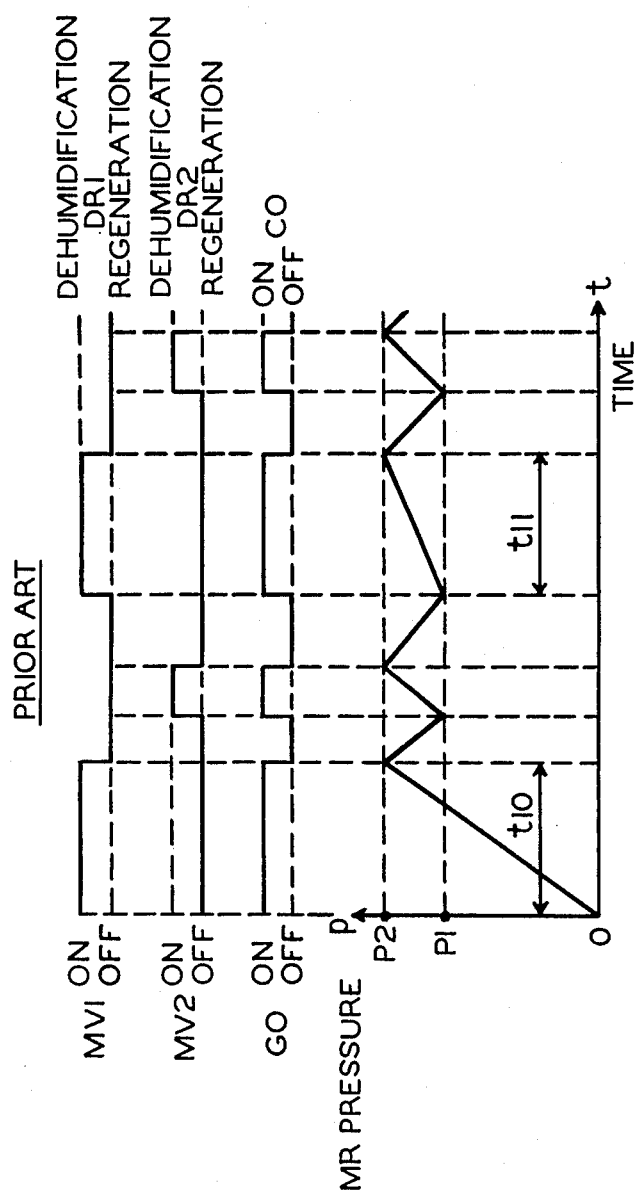
FIG. 6 is a time chart showing another conventional control process of FIG. 4.

Referring now to FIG. 2, there is shown the structural arrangement of the two-cylinder type dehumidification system of the present invention which is similar to that of FIG. 4. Thus, a detailed explanation is omitted for the sake of convenience. In viewing FIG. 3, it will be seen that there is shown an electronic control circuit for the electromagnetic valves MV1 and MV2. FIG. 1 is a time chart or diagram showing the process of operation of the dehumidification and regeneration system of FIGS. 2 and 3.

As shown, the electronic control circuit of FIG. 3 basically includes a flip-flop circuit FF, a trigger transformer Tt, a trigger circuit TC, and a switch SW which is connected to the governor GO.

The electromagnetic valve MV1 is located between the output switching power terminal SW1 of the flip-flop circuit FF and the 100-volt power source DC while the electromagnetic valve MV2 is located between the output switching power terminal SW2 and the 100-volt power source DC. The trigger input terminals TI1 and TI2 are connected to the trigger circuit TC and the trigger transformer Tt via diodes D1 and D2 and the condensers Ct1 and Ct2. Since the flip-flop circuit FF is well known, a more detailed explanation is omitted for convenience purposes.

The trigger circuit TC is connected in series by a switch SW. Thus, the trigger circuit is connected between ground and the power source DC by switch SW. The preset time T is determined by an R-C circuit which includes the resistor R7 and the condenser C3 which forms the timer. The preset time T is the time between the activation of the switch SW and the charge of the condenser C3 and the time when the unijunction transistor UJT turns on. The trigger pulse activated by the unijunction transistor UJT is conveyed to the flip-flop circuit FF through the condenser Ct1. Since the trigger circuit TC is also well known already, a detailed description of it is also omitted for convenience purposes.

The trigger transformer Tt is also connected in series with the switch SW. Thus, the upper end of the transformer Tt is connected to the power source DC via switch SW. The lower end of transformer Tt is directly connected to ground of the power source. The transformer Tt is also connected to the flip-flop circuit FF. The trigger pulse is initiated by the switch SW, and the pulse is conveyed to the flip-flop circuit FF through the condenser Ct2.

In viewing FIG. 3, it will be noted that S1 and S2 are surge equalizers, C1 and C2 are condensers, R1, R2, R3, R4, R5, R6, R7 and R8 are resistors, D3 and D4 are diodes, and finally Tr1 and Tr2 are transistors.

Next, the operation of the present invention is best explained by synthesizing FIGS. 1-3.

First, when the power source DC of the control circuit is turned on, either one of the two NPN transistors Tr1 or Tr2 of the flip-flop circuit FF is rendered conductive. In describing the following operation, let us assume that transistor Tr2 is activated. At this time, the electromagnetic valve MV1 is in the exhaust position b while the electromagnetic valve MV2 is in the supply position a. Under this condition, the air reservoir is open to atmosphere.

When the power source of the governor GO is turned on, it senses the pressure in the air reservoir MR as being at atmospheric pressure, and the air compressor CO starts to operate. Simultaneously, the switch SW is closed so that the condenser C3 of the trigger circuit TC begins to charge, and the preset time period T starts to run. Also by the activation of the switch SW, a negative trigger pulse is produced across the secondary winding of the trigger transformer Tt. This pulse deactivates the switching input terminal T12 of the flip-flop circuit FF while the transistor Tr1 is activated. The electromagnetic valve MV1 turns on and is switched to the supply position a, and the electromagnetic valve MV2 is switched to the exhaust position b. By this operation, dehusidifying action occurs in the one dehumidification cylinder DR1, and regenerating action takes place in the other dehumidification cylinder DR2.

In this condition, when the preset time T elapses, the unijunction transistor UJT of the trigger circuit TC turns on, the condenser C3 discharges, and produces a negative trigger pulse. This pulse turns on the transistor Tr1 and turns off the transistor Tr2. Thus, the electromagnetic valve MV1 is turned off and moves to its exhaust position b, while the electromagnetic valve MV2 is turned on and moves to its supply position a.

Therefore, dehumidification occurs in cylinder DR2 and regeneration in cylinder DR1. This switching of dehumidification and regeneration is continued until the air compressor CO stops operating.

At time t1, the pressure in the air reservoir MR reaches the upper limit surge pressure value of P2. The governor GO senses the pressure P2 and turns off. When the air compressor CO stops, the switch SW is opened. At this stage, a positive trigger pulse is generated across the secondary winding of the trigger transformer Tt. However, this negative pulse is blocked by the diodes D1 and D2. Thus, the base biasing voltage on the transistors Tr1 and Tr2 is not affected. That is, the two transistors Tr1 and Tr2 remain in the same state. Therefore, the two electromagnetic valves MV1 and MV2 remain in the state they were in prior to the stoppage of the air compressor CO. Accordingly, the electromagnetic valve MV1 is in its supply position a and the electromagnetic valve MV2 is in its exhaust position b.

At time t2, the pressure in the air reservoir MR decrease to the lower limit surge pressure value of P1. At this time, the governor GO activates the air compressor CO and closes the switch SW. The operation this time is the same as described in the initial description. The negative trigger pulse of the trigger transformer Tt activates the flip-flop circuit FF. Then the cylinder DR2 dehumidifies and the cylinder DR1 regenerates.

Since time period t3 is less than the preset time T, the two dehumidification cylinders DR1 and DR2 remain in the same state. After time period t4 elapses, the negative trigger pulse of the trigger transformer Tt accompanying the activation of the governor GO causes the reversal in the state of the dehumidification cylinder DR1 and DR2.

Since time t5 is more than the preset time T, the dehumidification and regeneration in the cylinders DR1 and DR2 are reversed by the trigger pulse of the trigger circuit TC at each preset time T.

At time t6, just prior to the stoppage of the air compressor CO, the final state of time period t5 is retained. At time t7, the state of time t6 is reversed. At time t8, the final state of time t7 is retained.

In the invention illustrated in the above-mentioned embodiment, the operation is synchronized with the air compressor apparatus along with the timer control circuit. That is, when the air compressor stops, the operating state or condition right before the stoppage is retained. At the same time, when the air compressor operation time is less than the preset time T, the switching of dehumidification and regeneration cycle does not occur. Therefore, under such circumstances, the unnecessary switching is eliminated and the wear and tear of the switching unit decreases proportionally. When the air compressor starts again to operate, the reversion to the prior state occurs so that the switching of dehumidification and regeneration occurs. When the operation time becomes more than preset time T, the dehumidification and regeneration are reversed. Thus, prolonged dehumidification is prevented and effective dehumidification becomes possible. There is no need to increase the amount of desiccanting medium since more effective drying is realized.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. An air drying system comprising a pair of cylindrical dehumidifiers containing a desiccating medium, an air compressor supplying moist air to the inlet of one of the cylindrical dehumidifiers and flowing toward the outlet of one of the cylindrical dehumidifiers so that the moist air is dehumidified and is dried by the desiccating medium in one of the cylindrical dehumidifiers and letting a portion of this dry air from the one cylindrical dehumidifier to flow through the other cylindrical dehumidifier from its outlet to its inlet so that the desiccating medium in the other of the cylindrical dehumidifiers is regenerated, means for setting the time period for dehumidification, means for operating the air compressor for a time period which is longer than the set time period, means for switching the dehumidification cylinder from dehumidifying to regenerating at the set time period, and means for stopping the air compressor but retaining the condition within the dehumidification cylinder as it was before the stopping of the air compressor and for reversing the condition within the dehumidification cylinders when the air compressor is restarted.

2. The air drying system as defined in claim 1, wherein a combination of said means forms an electronic control circuit.

3. The air drying system as defined in claim 2, wherein said electronic control circuit includes a flip-flop circuit for controlling the conductive condition of a pair of electromagnetic valves.

4. The air drying system as defined in claim 3, wherein said flip-flop circuit includes a pair of NPN transistors.

5. The air drying system as defined in claim 2, wherein said electronic control circuit includes a trigger circuit having a unijunction transistor.

6. The air drying system as defined in claim 2, wherein said electronic control circuit includes a flip-flop circuit, a timing circuit, and a trigger transformer for controlling a pair of electromagnetic valves.

* * * * *